(12) United States Patent
Ponomarev

(10) Patent No.: US 10,175,052 B2
(45) Date of Patent: Jan. 8, 2019

(54) METHOD OF DETERMINING A GEOLOCATION OF AN ELECTRONIC DEVICE

(71) Applicant: YANDEX EUROPE AG, Lucerne (CH)

(72) Inventor: Aleksandr Gennadievich Ponomarev, Voronezh (RU)

(73) Assignee: YANDEX EUROPE AG, Lucerne (CH)

( * ) Notice: Subject to any disclaimer, the term of this patent is extended or adjusted under 35 U.S.C. 154(b) by 87 days.

(21) Appl. No.: 15/511,396

(22) PCT Filed: Jun. 23, 2015

(86) PCT No.: PCT/IB2015/054714
§ 371 (c)(1),
(2) Date: Mar. 15, 2017

(87) PCT Pub. No.: WO2016/151369
PCT Pub. Date: Sep. 29, 2016

(65) Prior Publication Data
US 2017/0248429 A1    Aug. 31, 2017

(30) Foreign Application Priority Data

Mar. 20, 2015    (RU) ................................ 2015109686

(51) Int. Cl.
*G01C 21/30*    (2006.01)
*G01S 19/48*    (2010.01)
*G01S 19/49*    (2010.01)

(52) U.S. Cl.
CPC .............. *G01C 21/30* (2013.01); *G01S 19/48* (2013.01); *G01S 19/49* (2013.01)

(58) Field of Classification Search
CPC .......... G01C 21/30; G01S 19/48; G01S 19/49
See application file for complete search history.

(56) References Cited

U.S. PATENT DOCUMENTS 6,502,033 B1    12/2002  Phuyal
6,615,136 B1     9/2003  Swope et al.
(Continued)

FOREIGN PATENT DOCUMENTS

WO    2010129221 A1    11/2010
WO    2015016906 A1     2/2015

OTHER PUBLICATIONS

Johnson et al., Driving Style Recognition Using a Smartphone as a Sensor Plafform,2011 14th International IEEE Conference on Intelligent Transportation Systems Washington, DC, USA, Oct. 5-7, 2011, pp. 1609-1615.

(Continued)

*Primary Examiner* — Thomas Ingram
(74) *Attorney, Agent, or Firm* — BCF LLP

(57) ABSTRACT

There is disclosed a method of determining a geolocation of an electronic device having a first and second sensor, executable at a server, comprising acquiring route information from a first geo-point to a second geo-point; determining a plurality of route points along the route and receiving, from the first sensor a state indicative of the geo-position; determining the geo-location of one of the plurality of route points; receiving, from the second device sensor a state associated with a specific geo-maneuver at the given route point; comparing the second sensor state to a predetermined second sensor state for the given route point and for the specific geo-maneuver; determining that the device has deviated from the route at the route point; generating revised route information based on a difference of the second sensor state and the geo-position of the first sensor state; sending the revised route to the device.

18 Claims, 7 Drawing Sheets

(56) References Cited

U.S. PATENT DOCUMENTS

| | | | |
|---|---|---|---|
| 7,831,407 B2 | 11/2010 | Huang et al. | |
| 8,332,149 B2 | 12/2012 | Oohashi et al. | |
| 8,396,659 B2 | 3/2013 | Ando et al. | |
| 8,401,787 B2 | 3/2013 | Kang et al. | |
| 8,460,001 B1 | 6/2013 | Chuang | |
| 8,498,813 B2 | 7/2013 | Oohashi et al. | |
| 8,643,544 B2 * | 2/2014 | Taylor | G01C 21/206 342/357.25 |
| 8,892,310 B1 * | 11/2014 | Palmer | G07C 5/008 701/41 |
| 8,930,081 B2 | 1/2015 | Bolourchi et al. | |
| 8,965,621 B1 | 2/2015 | Urmson et al. | |
| 2009/0063051 A1 | 3/2009 | Watanabe et al. | |
| 2010/0159947 A1 | 6/2010 | Imafuku | |
| 2011/0291884 A1 | 12/2011 | Oh et al. | |
| 2011/0307171 A1 | 12/2011 | Waite | |
| 2011/0313662 A1 | 12/2011 | Huang et al. | |
| 2013/0096731 A1 * | 4/2013 | Tamari | G06F 11/3013 701/1 |
| 2013/0210405 A1 | 8/2013 | Whipple et al. | |
| 2013/0214967 A1 | 8/2013 | Shin | |
| 2014/0070986 A1 | 3/2014 | Gao et al. | |

OTHER PUBLICATIONS

Wang et al, Sensing Vehicle Dynamics for Determining Driver Phone Use, MobiSys'13, Jun. 25-28, 2013, Taipei, Taiwan.

International Search Report from PCT/IB2015/054714, dated Oct. 23, 2015, Shane Thomas.

International Preliminary Report on Patentability from PCT/IB2015/054714, dated Feb. 2, 2016, Thomas Black.

* cited by examiner

METHOD OF DETERMINING A GEOLOCATION OF AN ELECTRONIC DEVICE

CROSS-REFERENCE

The present application claims priority to Russian Patent Application No. 2015109686, filed Mar. 20, 2015, entitled "A METHOD OF DETERMINING A GEOLOCATION OF AN ELECTRONIC DEVICE" the entirety of which is incorporated herein.

TECHNICAL FIELD

The present technology relates to methods of determining a geolocation of an electronic device.

BACKGROUND

Many electronic devices available to a user nowadays provide geo-location and routing information. Some of these electronic devices are dedicated purely to provision of the geo-location and routing information. An example of such devices would be a portable GPS navigator, such as those available from TomTom Corporation of Amsterdam, The Netherlands. Another example of such devices would be a GPS navigator, built-in into a car. For example, many car manufacturers provide an option to include a built-in navigation system into their cars. Other electronic devices provide geo-location and route information as an add-on to other functions. For example, most smartphones available on the market today include an application that provides geo-location and routing services.

In order to provide such geo-location and routing information services, a typical electronic device includes a satellite navigation module, for example, one based on a global positioning system (GPS). The GPS allows a satellite navigation receiver, e.g., a GPS receiver module of a smartphone, to determine its location and velocity based on satellite signals. The GPS may include a constellation of GPS satellites orbiting the Earth. There can be at least four GPS satellites visible at a given time and a given place on the Earth's surface. Each GPS satellite continuously broadcasts GPS signals at a predetermined frequency. The GPS signals contain time and orbital information for the satellites. A GPS receiver can receive the GPS signals transmitted from at least four GPS satellites synchronously. Based on the time and orbital information from at least four GPS satellites, geographical coordinates of the GPS receiver including latitude, longitude, and altitude can be calculated.

It is generally known that the accuracy of the GPS-based positioning system depends, largely, on atmospheric characteristics, as well as the location of the electronic device that attempts to use the GPS-based positioning system. For example, if the user of the electronic device attempts to use the GPS-based positioning system in an underground parking, the user will generally experience problems with using GPS-based positioning system.

SUMMARY

It is an object of the present technology to ameliorate at least some of the inconveniences present in the prior art.

According to a first broad aspect of the present technology, there is provided a method of determining a geolocation of an electronic device, the electronic device having a first sensor and a second sensor. The method is executable at a server. The server is in communication with the electronic device via a communications network. The method comprises: acquiring a route information associated with a route for the electronic device, the route information being a path from a first geo-point to a second geo-point; determining a plurality of route points along the route; for a given one of the plurality of route points: receiving, from the first sensor, a first sensor state, the first sensor state indicative of the electronic device geo-position; based on the electronic device geo-position, determining the geo-location of the given one of the plurality of route points; receiving, from the second device sensor, a second sensor state associated with a specific geo-maneuver at the given route point; comparing the second sensor state to a predetermined second sensor state for the given route point and for the specific geo-maneuver; responsive to the second sensor state being indicative of a variance from the predetermined second sensor state, determining that the first electronic device has deviated from the route at the given route point; generating a revised route information, including a revised geo-position of the electronic device in association with the given route point, the generating being based on a difference of the second sensor state and the electronic device geo-position generated based on the first sensor state; sending the revised route information to the electronic device.

In some embodiments of the method, the first sensor comprises a GPS module.

In some embodiments of the method, the second sensor comprises a sensor different from the GPS module.

In some embodiments of the method, the second sensor comprises at least one of:
  an accelerometer,
  an ambient temperature measurement device,
  a device for measuring the force of gravity,
  a gyroscope,
  a device for measuring ambient light,
  a device for measuring acceleration force,
  a device for measuring ambient geomagnetic field,
  a device for measuring a degree of rotation,
  a device for measuring ambient air pressure,
  a device for measuring relative ambient humidity,
  a device for measuring device orientation,
  a device for measuring temperature of the device.

In some embodiments of the method, the method further comprises, prior to the acquiring the route information, generating the predetermined second sensor state.

In some embodiments of the method, generating the predetermined second sensor state comprises: acquiring, from a plurality of electronic devices, a plurality of indications of a previous second sensor states, each of the plurality of indications of a previous second sensor state associated with a previous second device sensor, the previous second sensor being of a same type as the second device sensor, a respective indication of the previous second sensor state being generated during a previous geo-maneuver, the previous geo-maneuver being of a same type as the specific geo-maneuver; analyzing the plurality of indications of a previous second sensor state to render a statistical maneuver pattern; assigning the statistical maneuver pattern as the predetermined second sensor state for the specific geo-maneuver.

In some embodiments of the method, analyzing the plurality of indications comprises calculating a statistical average of the previous second sensor state.

In some embodiments of the method, the calculating statistical average comprises assigning an impact score to each of the plurality of indications of a previous second sensor state.

In some embodiments of the method, the method further comprises, prior to the acquiring a route information associated with a route for the electronic device, defining plurality of route points along the route, the route being one of a plurality of routes.

In some embodiments of the method, the defining a plurality of route points comprises receiving an indication of the plurality of route points along the route from an operator.

In some embodiments of the method, the defining a plurality of route points is based on a pre-determined rule.

In some embodiments of the method, the pre-determined rule includes defining a route point at a portion of the route where there is a possibility for a deviation from the route.

In some embodiments of the method, the first electronic device is one of a plurality of electronic devices, the second sensor is one of a plurality of second sensors respectively associated with the plurality of electronic devices and the second sensor state is one of a plurality of second sensor states respectively generated by the plurality of second device sensors, the method further comprising: in response to the plurality of second sensor states being indicative of the deviation from the route information, determining that there is a route problem associated with the route information at the given one of the plurality of route points.

A server comprising: a communication interface for communication with an electronic device via a communication network, a memory module; a processor operationally connected with the communication interface and the memory module, the processor configured to determine a geolocation of an electronic device, the electronic device having a first sensor and a second sensor, the processor being further configured to: acquiring a route information associated with a route for the electronic device, the route information being a path from a first geo-point to a second geo-point; determine a plurality of route points along the route; for a given one of the plurality of route points: receive, from the first sensor, a first sensor state, the first sensor state indicative of the electronic device geo-position; based on the electronic device geo-position, determine the geo-location of the given one of the plurality of route points; receive, from the second device sensor, a second sensor state associated with a specific geo-maneuver at the given route point; compare the second sensor state to a predetermined second sensor state for the given route point and for the specific geo-maneuver; responsive to the second sensor state being indicative of a variance from the predetermined second sensor state, determine that the first electronic device has deviated from the route at the given route point; generate a revised route information, including a revised geo-position of the electronic device in association with the given route point, the generating being based on a difference of the second sensor state and the electronic device geo-position generated based on the first sensor state; send the revised route information to the electronic device.

In some embodiments of the server, the first sensor comprises a GPS module.

In some embodiments of the server, the second sensor comprises a sensor different from the GPS module.

In some embodiments of the server, the second sensor comprises at least one of:
an accelerometer,
an ambient temperature measurement device,
a device for measuring the force of gravity,
a gyroscope,
a device for measuring ambient light,
a device for measuring acceleration force,
a device for measuring ambient geomagnetic field,
a device for measuring a degree of rotation,
a device for measuring ambient air pressure,
a device for measuring relative ambient humidity,
a device for measuring device orientation,
a device for measuring temperature of the device.

In some embodiments of the server, the processor being further configured, prior to the acquiring the route information, to generate the predetermined second sensor state.

In some embodiments of the server, to generate the predetermined second sensor state, the processor is configured to: acquire, from a plurality of electronic devices, a plurality of indications of a previous second sensor states, each of the plurality of indications of a previous second sensor state associated with a previous second device sensor, the previous second sensor being of a same type as the second device sensor, a respective indication of the previous second sensor state being generated during a previous geo-maneuver, the previous geo-maneuver being of a same type as the specific geo-maneuver; analyze the plurality of indications of a previous second sensor state to render a statistical maneuver pattern; assign the statistical maneuver pattern as the predetermined second sensor state for the specific geo-maneuver.

In some embodiments of the server, to analyze the plurality of indications, the processor is configured to calculate a statistical average of the previous second sensor state.

In some embodiments of the server, to calculate statistical average, the processor is configured to assign an impact score to each of the plurality of indications of a previous second sensor state.

In some embodiments of the server, the processor being further configured, prior to the acquiring a route information associated with a route for the electronic device, to define plurality of route points along the route, the route being one of a plurality of routes.

In some embodiments of the server, to define a plurality of route points, the processor is configured to receive an indication of the plurality of route points along the route from an operator.

In some embodiments of the server, to define a plurality of route points, the processor is configured to apply a pre-determined rule.

In some embodiments of the server, the pre-determined rule includes defining a route point at a portion of the route where there is a possibility for a deviation from the route.

In some embodiments of the server, the first electronic device is one of a plurality of electronic devices, the second sensor is one of a plurality of second sensors respectively associated with the plurality of electronic devices and the second sensor state is one of a plurality of second sensor states respectively generated by the plurality of second device sensors, the processor being further configured: in response to the plurality of second sensor states being indicative of the deviation from the route information, to determine that there is a route problem associated with the route information at the given one of the plurality of route points.

In the context of the present specification, a "server" is a computer program that is running on appropriate hardware and is capable of receiving requests (e.g. from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "client device" is any computer hardware that is capable of running software appropriate to the relevant task at hand. Thus, some (non-limiting) examples of client devices include personal computers (desktops, laptops, netbooks, etc.), smartphones, and tablets. It should be noted that a device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "component" is meant to include software (appropriate to a particular hardware context) that is both necessary and sufficient to achieve the specific function(s) being referenced.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the expression "interactive" is meant to indicate that something is responsive to a user's input or that at least portions thereof are responsive to a user's input.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
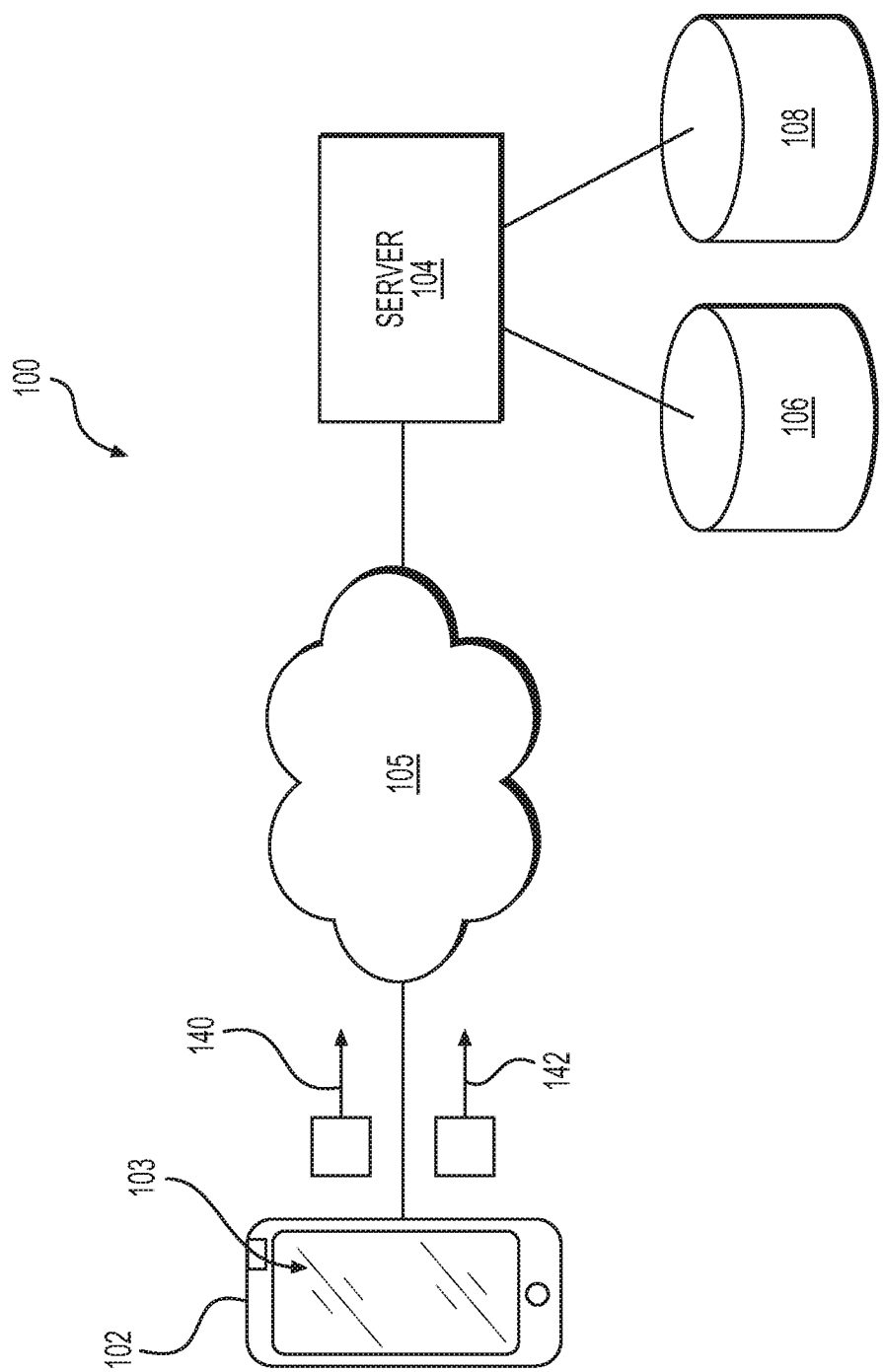
FIG. 1 is a schematic diagram of an exemplary system for determining a geolocation of an electronic device, the system being implemented in accordance with non-limiting embodiments of the present technology.

Referring to FIG. 1, there is shown an exemplary schematic diagram of a system 100 being suitable for implementing non-limiting embodiments of the present technology. It is to be expressly understood that the system 100 is depicted as merely as an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 100 may provide in certain instances simple implementations of the present technology, and that where such is the case they have been presented in this manner as an aid to understanding. As persons skilled in the art would understand, various implementations of the present technology may be of a greater complexity.

The system 100 comprises an electronic device 102. The electronic device 102 is typically associated with a user (not depicted) and, as such, can sometimes be referred to as a "client device". It should be noted that the fact that the electronic device 102 is associated with the user does not need to suggest or imply any mode of operation—such as a need to log in, a need to be registered or the like.

The implementation of the electronic device 102 is not particularly limited, but as an example, the electronic device 102 may be implemented as a personal computer (desktops, laptops, netbooks, etc.), a wireless electronic device (a cell phone, a smartphone, a tablet and the like), as well as network equipment (a router, a switch, or a gateway). Merely for the purposes of an illustration, it shall be assumed that the electronic device 102 is implemented as a smartphone computer, such as an iPhone 5™ smartphone provided by Apple Corporation.

The electronic device 102 comprises hardware and/or software and/or firmware (or a combination thereof) to execute a number of applications. For the purposes of illustration of the embodiments of the present technology, it shall be assumed that the electronic device 102 is configured to execute a map application 103. Generally speaking, the purpose of the map application 103 is to enable the user (not depicted) of the electronic device 102 to (i) display a map of a current location; (ii) display a map of a location based on the location address, postal code and/or a name of a Point of Interest associated with the location; (iii) determine a route from a geographical location A to a geographical location B; (iv) display the route to the user (as well as potentially alternative routes) with the traffic conditions displayed thereupon; (v) provide a turn-by-turn navigation by means of spoken commands; and (vi) perform a number of additional functions known to those of skill in the art.

The map application 103 can be, but not limited to, a dedicated mapping application, such as the Yandex.Maps™ application for mobile devices, a web browser, or any other application that can provide for displaying map information. In those embodiments, where the map application 103 is executed as an application, the map application 103 can be "native" to the operating system of the electronic device 102 (i.e. being provided as part of the operating system package) or can be downloaded and installed by the user of the electronic device 102. In a particular embodiment of the present technology, the map application 103 can be implemented on a web page that is not otherwise dedicated to maps (such as, for example, a Google™ Chrome™ browser, a Yandex.Browser™ application and the like). Within the latter example, the user can activate the map application 103 by typing a Universal Resource Locator (URL) address associated with a web site that hosts the map application 103 into the address bar of the browser and accessing the web site that hosts the map application 103.

As has been mentioned in the paragraphs above, the implementation of the electronic device 102 is not particularly limited. In a specific embodiment and with brief reference to FIG. 6, a schematic diagram of the electronic device 102 is depicted and now will be described. The electronic device 102 may comprise a processor 603. In a particular embodiment, the processor 603 may comprise one or more processors and/or one or more microcontrollers configured to execute instructions and to carry out operations associated with the operation of the electronic device 102. In various embodiments, processor 603 may be implemented as a single-chip, multiple chips and/or other electrical components including one or more integrated circuits and printed circuit boards. Processor 603 may optionally contain a cache memory unit (not depicted) for temporary local storage of instructions, data, or computer addresses. By way of example, the processor 603 may include one or more processors or one or more controllers dedicated for certain processing tasks of the electronic device 102 or a single multi-functional processor or controller.

The processor 603 is operatively coupled to a memory module 604. Memory module 604 may encompass one or more storage media and generally provide a place to store computer code (e.g., software and/or firmware). By way of example, the memory module 604 may include various tangible computer-readable storage media including Read-Only Memory (ROM) and/or Random-Access Memory (RAM). As is well known in the art, ROM acts to transfer data and instructions uni-directionally to the processor 603, and RAM is used typically to transfer data and instructions in a bi-directional manner. Memory module 604 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to the processor 603. Information may also reside on one or more removable storage media loaded into or installed in the electronic device 102 when needed. By way of example, any of a number of suitable memory cards (e.g., SD cards) may be loaded into the electronic device 102 on a temporary or permanent basis.

The memory module 604 may store inter alia a series of computer-readable instructions, which instructions when executed cause the processor 603 (as well as other components of the electronic device 102) to execute the various operations described herein.

The electronic device 102 further comprises an input output module 606. Input output module 606 may comprise one or more input and output devices operably connected to processor 603. For example, input output module 606 may include keyboard, mouse, one or more buttons, thumb wheel, and/or display (e.g., liquid crystal display (LCD), light emitting diode (LED), Interferometric modulator display (IMOD), or any other suitable display technology). Generally, input devices are configured to transfer data, commands and responses from the outside world into electronic device 102. The display is generally configured to display a graphical user interface (GUI) that provides an easy to use visual interface between a user of the electronic device 102 and the operating system or application(s) running on the electronic device 102. Generally, the GUI presents programs, files and operational options with graphical images. During operation, the user may select and activate various graphical images displayed on the display in order to initiate functions and tasks associated therewith. Input output module 606 may also include touch based devices such as touchpad and touch screen. A touchpad is an input device including a surface that detects touch-based inputs of users. Similarly, a touch screen is a display that detects the presence and location of user touch inputs. Input output module 606 may also include dual touch or multi-touch displays or touchpads that can identify the presence, location and movement of more than one touch inputs, such as two or three finger touches.

In the particular embodiment of the electronic device 102 being implemented as a smartphone, the input output module 606 can be implemented a touch-sensitive screen.

In particular embodiments, electronic device 102 may additionally comprise an audio module 608, a camera module 610, a wireless communication module 612, a sensor module 614, and/or wired communication module 616, all operably connected to the processor 603 to facilitate various functions of electronic device 102.

For example, the camera module 610, including an optical sensor (e.g., a charged coupled device (CCD), or a complementary metal-oxide semiconductor (CMOS) image sensor), can be utilized to facilitate camera functions, such as recording photographs and video clips. For example, the wired communication module 616 can include a Universal Serial Bus (USB) port for file transferring, or an Ethernet port for connection to a local area network (LAN). Additionally, the electronic device 102 may be powered by a power source module 618, which can be executed as rechargeable battery or the like.

Wireless communication module 612 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication module 612 may include hosting protocols such that electronic device 102 may be configured as a base station for other wireless devices.

Figure 7:
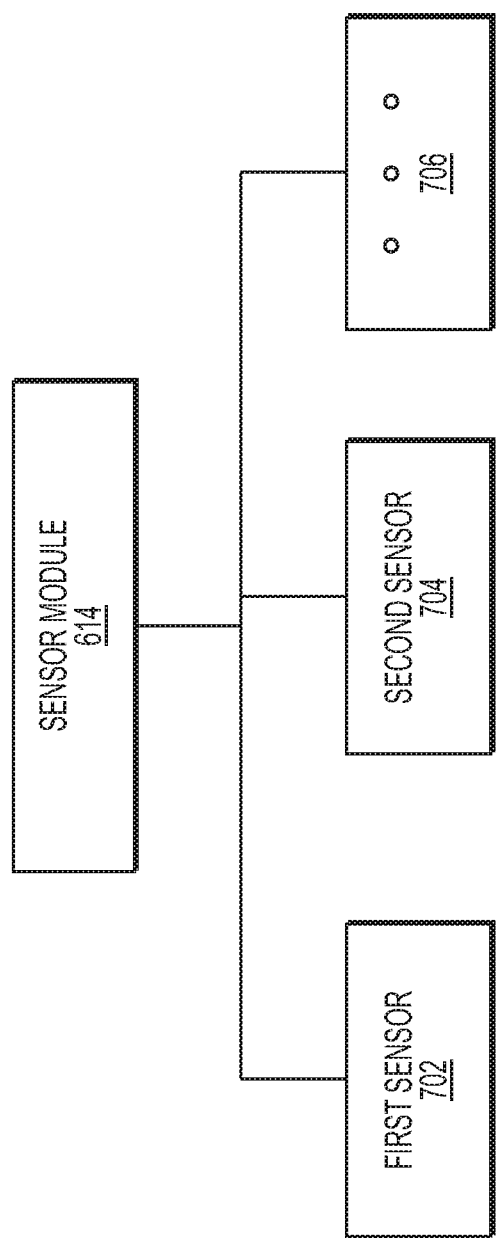
FIG. 7 depicts a schematic representation of a sensor module of the electronic device of FIG. 6.

The sensor module 614 may include one or more sensor devices to provide additional input and facilitate multiple functionalities of the electronic device 102. With brief reference to FIG. 7, FIG. 7 depicts a schematic representation of the sensor module 614. In accordance with non-limiting embodiments of the present technology, the sensor module 614 includes a first sensor 702 and a second sensor 704. The first sensor 702 can be implemented as a GPS module or a GLONASS module. Some examples of implementations of the second sensor 704 can include one or more: an accelerometer, an ambient temperature measurement device, a device for measuring the force of gravity, a gyroscope, a device for measuring ambient light, a device for measuring acceleration force, a device for measuring ambient geomagnetic field, a device for measuring a degree of rotation, a device for measuring ambient air pressure, a device for measuring relative ambient humidity, a device for measuring device orientation, a device for measuring temperature of the device, etc. It is noted that some of these devices can be implemented in hardware, software or a combination of the two.

The sensor module 614 also includes one or more additional sensors jointly depicted at 706. The one or more additional sensors 706 can include one or more of the other ones of: an accelerometer, an ambient temperature measurement device, a device for measuring the force of gravity, a gyroscope, a device for measuring ambient light, a device for measuring acceleration force, a device for measuring ambient geomagnetic field, a device for measuring a degree of rotation, a device for measuring ambient air pressure, a device for measuring relative ambient humidity, a device for measuring device orientation, a device for measuring temperature of the device, etc. It is noted that some of these devices can be implemented in hardware, software or a combination of the two.

Figure 6:
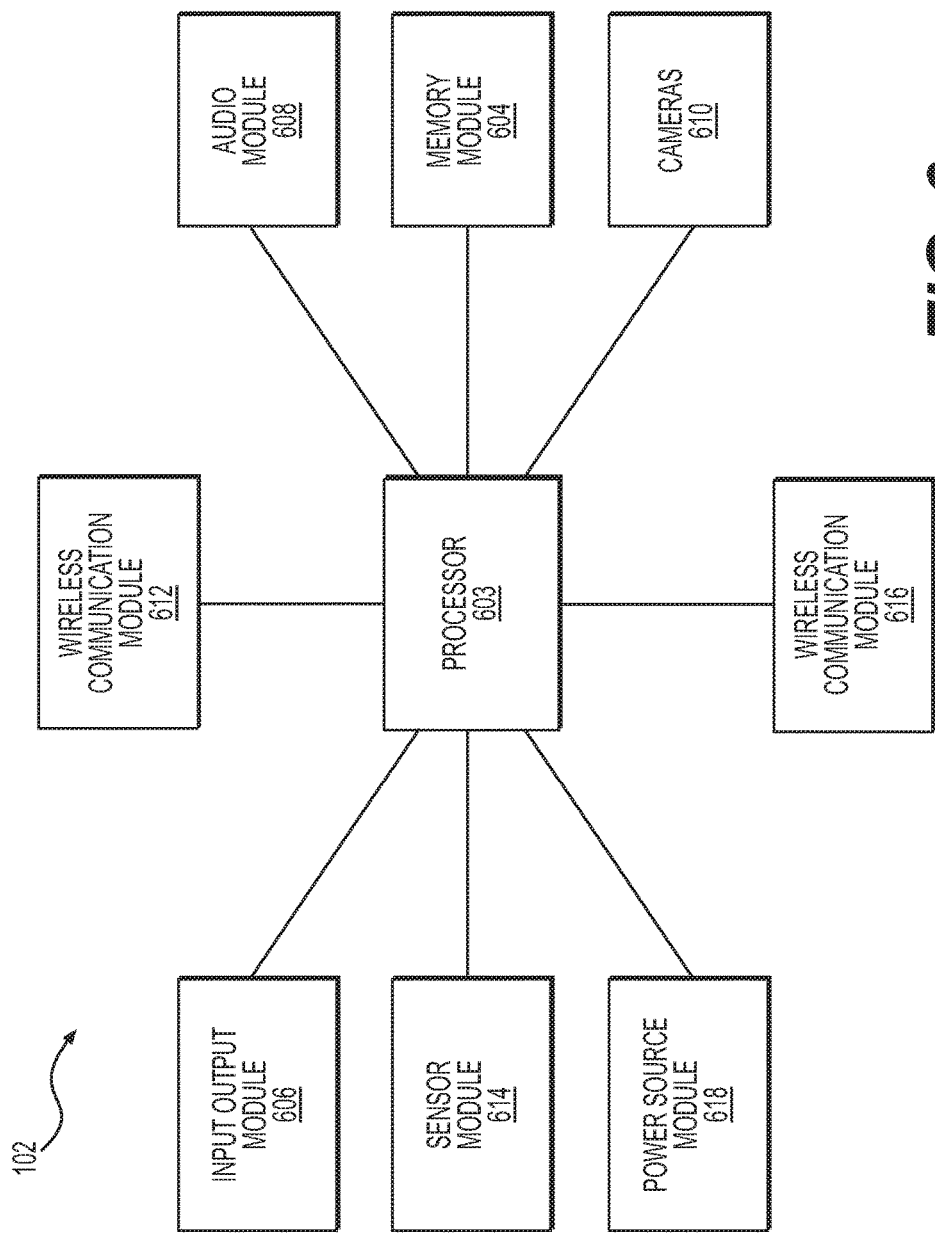
FIG. 6 depicts a schematic diagram of an electronic device of the system of FIG. 1, the electronic device being implemented in accordance with non-limiting embodiments of the present technology.

Returning to the description of FIG. 6, in particular embodiments, various components of electronic device 102 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these.

With reference to FIG. 1, the electronic device 102 is coupled to a communications network 105 via a communication link (not separately numbered). In some non-limiting embodiments of the present technology, the communications network 105 can be implemented as the internet. In other embodiments of the present technology, the communications network 105 can be implemented differently, such as any wide-area communications network, local-area communications network, a private communications network and the like.

How the communication link is implemented is not particularly limited and will depend on how the electronic device 102 is implemented. Merely as an example and not as a limitation, in those embodiments of the present technology where the electronic device 102 is implemented as a wireless communication device (such as a smart-phone), the communication link can be implemented as a wireless communication link (such as but not limited to, a 3G communications network link, a 4G communications network link, a Wireless Fidelity, or WiFi® for short, Bluetooth® and the like). In those examples, where the electronic device 102 is implemented as a notebook computer, the communication link can be either wireless (such as WiFi®, Bluetooth® or the like) or wired (such as an Ethernet based connection).

Also coupled to the communications network 105 is a mapping server 104. The mapping server 104 can be implemented as a conventional computer server. In an example of an embodiment of the present technology, the mapping server 104 can be implemented as a Dell™ PowerEdge™ Server running the Microsoft™ Windows Server™ operating system. It is contemplated that the mapping server 104 can be implemented in any other suitable hardware and/or software and/or firmware or a combination thereof. In the depicted non-limiting embodiment of present technology, mapping server 104 is a single server. In alternative non-limiting embodiments of the present technology, the functionality of the mapping server 104 may be distributed and may be implemented via multiple servers.

The mapping server 104 is coupled to the communications network 105 via a communication link (not numbered). How the communication link is implemented is not particularly limited and will depend on how the mapping server 104 is implemented. It is contemplated that the examples of implementations of the communication link coupling the electronic device 102 to the communications network 105 provided above could be applied to the communication link coupling the mapping server 104 to the communications network 105.

The mapping server 104 has access to a map database 106 and an application database 108. The functionality of the map database 106 and the application database 108 will be explained herein below. As will be discussed below, the mapping server 104 is adapted to receive from the client device 102 a request for a map section, via the communications network 105, to retrieve the requested map section from the map database 106, and to send the requested map section back to the client device 102, via the communications network 105.

Figure 3:
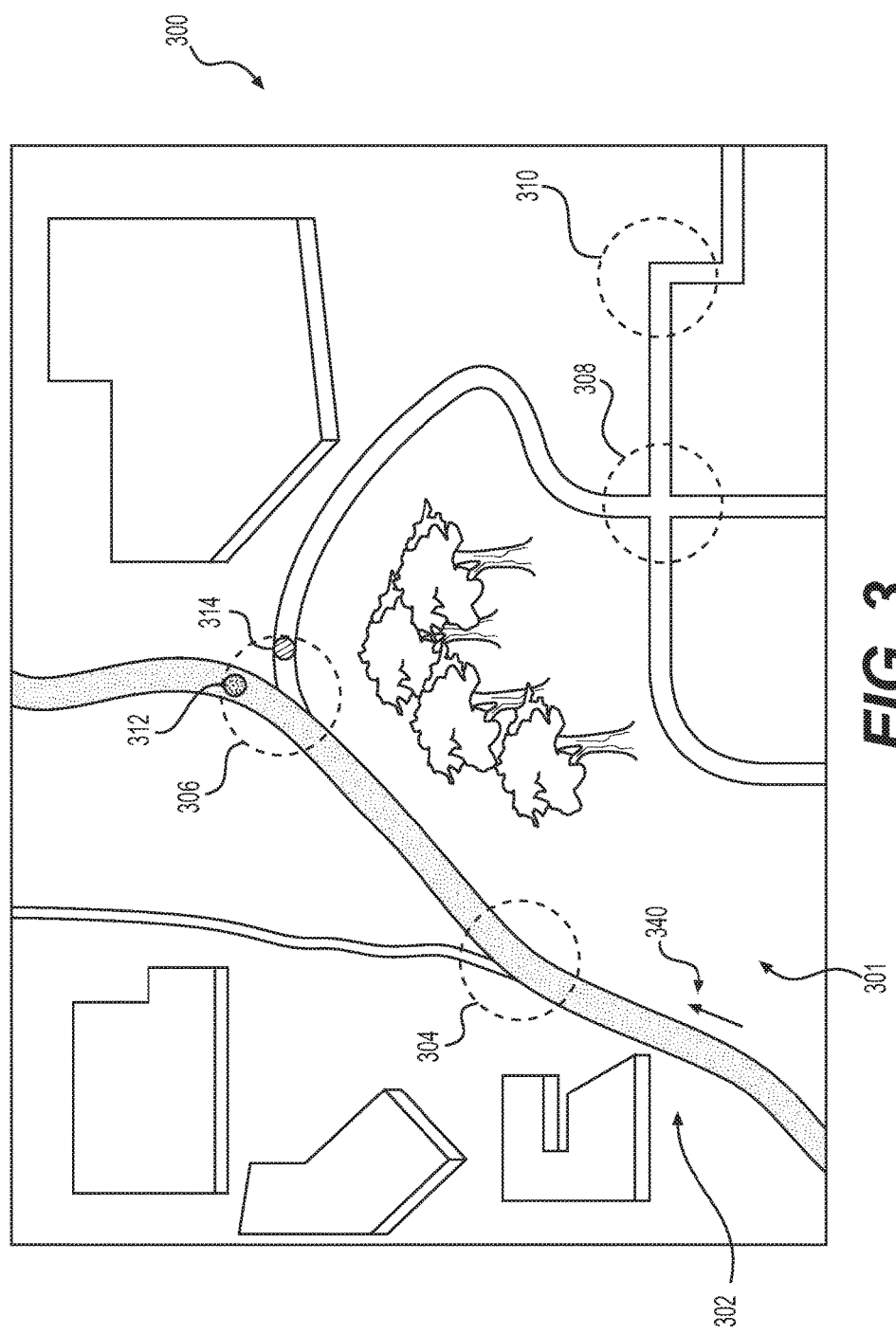
FIG. 3 illustrates an exemplary map image generated by the server of FIG. 1, the map image illustrating multiple route points along a route associated with an electronic device of the system of FIG. 1.

In order to illustrate embodiments of the present technology, reference will be made to an example illustration of a map view. With reference to FIG. 3, there is depicted a screen shot 300, the screen shot 300 being a non-limiting example of a map segment 301 displayed by the map application 103. The map segment 301 includes inter alia a route information 302, the route of information 302 being depicted as a hashed area (as an example only) along the route selected by the user of the electronic device, the route information 302 being, in a sense, a subset of all possible routes that can be taken within the map segment 301 visible within the screen shot 300. As is known to those of skill in the art, the map segment 301 and the route information 302 can become visible in response to the user activating the map application 103 and then generating one or more map requests. The one or more map requests may include, as an example, a request to view a portion of the map (such as a map of a particular area, an intersection, a point of interest, etc). The one or more map requests can also include a request for a listing of certain point(s) of interest in a close-by vicinity of the electronic device 102 (such as but not limited to: restaurants, banks, gas stations and the like). The one or more map requests can also include a request for a map route (submitted as a search query or a map query or the like), such as a route from a first point to a second point.

In accordance with embodiments of present technology, for each route associated with the given route information 302, the server 104 can determine one or more route points. In the illustrated embodiment, the server 104 has determined a first route point 304, a second route point 306, a third route point 308 and a fourth route point 310. In some embodiments of the present technology, an indication of each one of the first route point 304, the second route point 306, the third route point 308 and the fourth route point 310 can be manually entered by an operator of the server 104. In some embodiments of the present technology, an indication of each one of the first route point 304, the second route point 306, the third route point 308 and the fourth route point 310 can be generated by the server 104. In some embodiments, the indication of each one of the first route point 304, the second route point 306, the third route point 308 and the fourth route point 310 can be manually entered by an operator of the server 104 based on a pre-determined rule.

In accordance with embodiments of the present technology, the pre-defined rule can include associating a given route point with a portion of the route information 302, where there is a potential for a deviation from the route associated with the route information 302, such as a junction, a fork and the like. Examples of such route points would be the first route point 304 and the second route point 306—both being located at a respective forks in the road along the route associated with the route information 302. Another example, albeit not associated with the route that is associated with the route information 302, is the third route point 308—which is located at a junction along a road.

In some embodiments of the present technology, the server 104 can define one or more route points based on so called "map track information". The map track information generally contains information about one or more routes, the information including a starting point, an end point, as well as auxiliary information. Auxiliary information can include number of lanes, traffic light information, maximum speed, availability of pedestrian side walks and the like. The server 104 can use the information maintained within the map track information to define the location of the one or more route points in conjunction with other approaches described in the paragraphs above.

In other embodiments, the given route point can be associated with a portion of the route where the user of the electronic device 102 can execute a geo-maneuver. The nature of the geo-maneuver is not particularly limited and can include (but is not limited to): changing speed along a driving route, changing lanes along a driving route, driving through an underpass along a driving route, taking a sharp turn along a driving route, entering a building on a walking route, climbing stairs along a walking route and the like.

As has been alluded to above, the given route point (i.e. one of the first route point 304, the second route point 306, the third route point 308 and the fourth route point 310) is a point potentially associated with a deviation from the route information 302 (be it getting off the route or executing a different type of the geo-maneuver along the route). To illustrate, let's take an example of the second route point 304 and assume that the user of the electronic device 102 is driving along the route associated with the route information 302 in a direction depicted in FIG. 3 at 340. When the user of the electronic device 102 approaches the fork in the road associated with the second route point 306, the user can continue along the route associated with the route information 302 and eventually find herself at a point 312 or, for whatever reason, the user of the electronic device 102 may deviate from the route and eventually find herself at a point 314. Within this given example of the route represented by the route information 302, the user being at the point 306 would be along the route, while the user being at the point 314 would be not along the route or, in other words, deviating from the route associated with the route information 302.

Continuing the description of the functionality of the server 104, the map database 106 maintains data required to generate one or more map sections, such as the map segment 301 displayed within the illustration of FIG. 3. As is known to those of skill in the art, the map database 106 can store the one or more map sections in a form of so-called "map tiles". In some embodiments of the present technology, the map database 106 is configured to maintain data in accordance with the Tie Map Service specification promulgated by the Open Source Geospatial Foundation of 14525 SW Millikan, Beaverton, Oreg., United States of America.

Naturally, in alternative embodiments the present technology, the map database 106 can maintain the map tiles information in any other suitable proprietary or commercially available format.

In accordance with embodiments of the present technology, the mapping server 104 has access to the aforementioned application database 108. Generally speaking, the application database 108 can maintain information representative of a statistical maneuver pattern of the second sensor 704, the statistical maneuver pattern being based on the sensor state of the second sensor 704 during a particular maneuver at the particular one of the plurality of route points (i.e. one of the first route point 304, the second route point 306, the third route point 308 and the fourth route point 310).

The process of determining the statistical maneuver pattern will now be explained in greater detail. The server 104 is configured to receive data from one or more electronic devices similar to the electronic device 102, as the one or more electronic device follow the various routes, including the route associated with the route information 302. These electronic devices 102 may move through the route by means of the user of the electronic devices 102 driving through the routes, walking through the routes or using other means of transportation to get from point A to point B through the various routes.

More specifically, for each route point along the various routes (such as one of the first route point 304, the second route point 306, the third route point 308 and the fourth route point 310), the server 104 receives (i) a state information associated with the first sensor 702, the state information associated with the first sensor 702 indicative of the geo-location of the given one of the one or more electronic devices 102 (this can be a GPS coordinates appreciated using the first sensor 702) and (ii) a state information associated with the second sensor 704, the state information associated with the second sensor 704 indicative of a particular maneuver (which particular maneuver can include absence of a geo-maneuver).

In some embodiments of the present technology, the server 104 is configured to receive a plurality of indications of state information associated with a plurality of second sensors 704 of a respective plurality of electronic devices 102 (all of the plurality of second sensors 704 being of a same type) and to classify the received plurality of indications based on the type of the geo-maneuver potentially executable at the given one of the plurality of route points (i.e. one of the first route point 304, the second route point 306, the third route point 308 and the fourth route point 310). For example, using the example of the second route point 306, the list of potential geo-maneuvers that can be executed as the user of the electronic device 102 approaches the second route point 306 may include (but is not limited to): (a) take a slight left turn to eventually reach the point 312, (b) take a slight right turn to eventually reach the point 314; (c) accelerate, (d) decelerate or stop completely, (e) change lanes while performing the action as per (a) or (b), as well as (f) a number of additional geo-maneuvers.

For each of the above-listed geo-maneuvers, the state information associated with the reading of the second sensor 704 will vary (to a greater or smaller extent). For each of the geo-maneuvers for each of the route points, the server 104 can calculate a statistical maneuver pattern. In some embodiments of the present technology, the statistical maneuver pattern is indicative of a statistical average of the state information of the second sensors 704 of the plurality of electronic devices 102, the statistical average of state information associated with a particular maneuver at a particular route point (i.e. one of the first route point 304, the second route point 306, the third route point 308 and the fourth route point 310). In other words, the statistical average is representative of what the state information associated with the second sensors 704 should be for the particular maneuver at the particular route point (i.e. one of the first route point 304, the second route point 306, the third route point 308 and the fourth route point 310).

Figure 4:
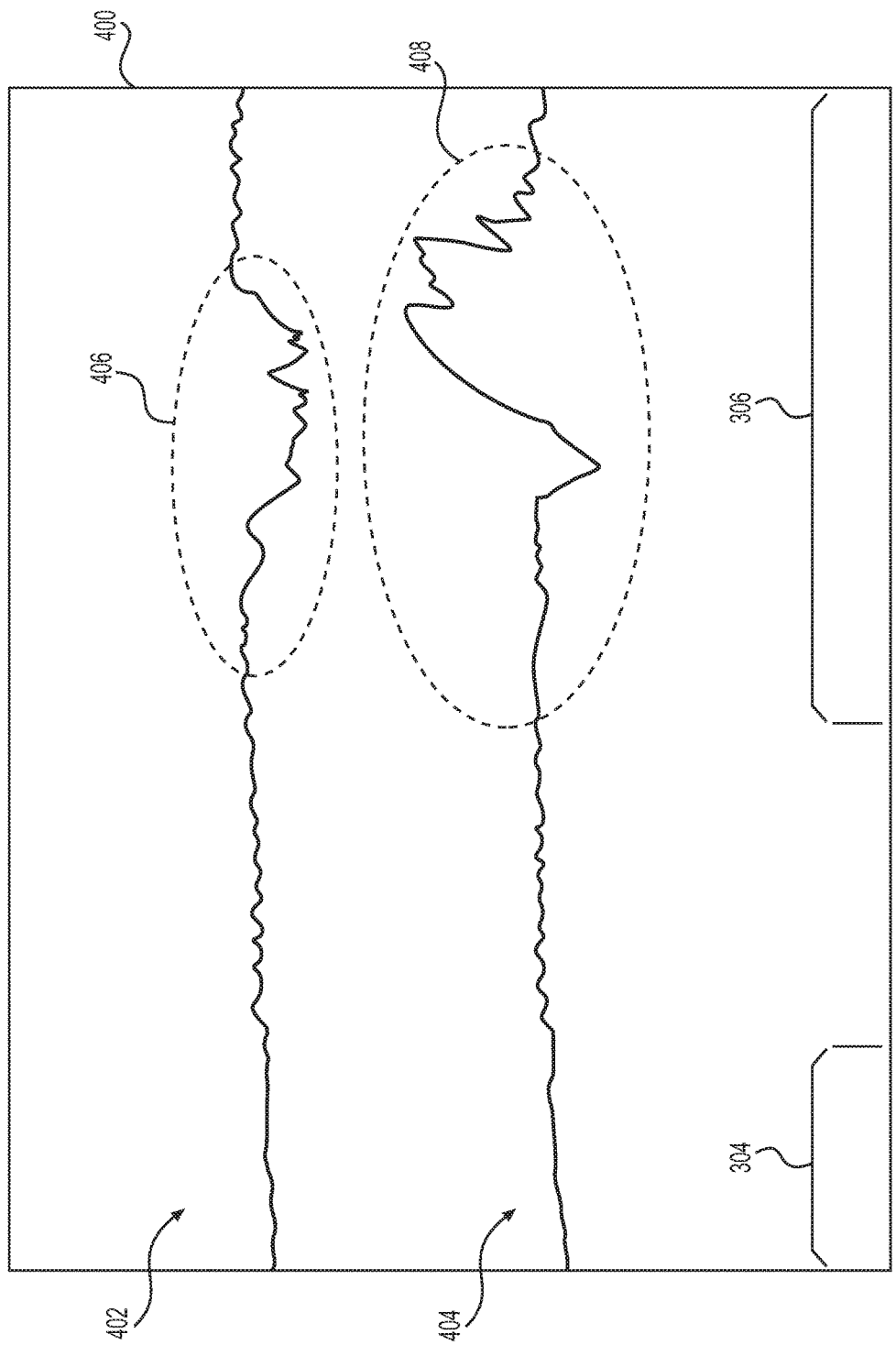
FIG. 4 is a schematic representation of a maneuver related sensor data used for populating the application database of FIG. 2.

Let's use the example of the second route point 306 and two possible geo-maneuvers: taking a slight left turn to eventually reach the point 312 and taking a slight right turn to eventually reach the point 314. With reference to FIG. 4, there is depicted a schematic representation of state information 400, taken over time, of a first electronic device and a second electronic device (the first and second electronic devices being similar to or different from the electronic device 102), at they move along the route associated with the route information 302, the first electronic device taking a slight left turn at the second route point 306 to eventually reach the point 312 (i.e. staying at the route) and the second electronic device taking a slight right turn to eventually reach the point 314 (i.e. deviating from the route associated with the route information 302).

Within the illustration of FIG. 4, there is depicted a first state information 402 associated with a first one of the plurality of electronic devices (such as the first electronic device mentioned above) and a second state information 404 associated with a second one of the plurality of electronic devices (such as the second electronic device mentioned above), the plurality of electronic devices being used for populating the statistical maneuver pattern. It is noted that the regions marked 304 and 306, respectively associated with portions of the first state information 402 and the second state information 404, are representative of the second device state information during respective portions of the route that is associated with the route information 302 (with a portion therebetween representing state information between the first route point 304 and the second route point 306).

Highlighted in a dotted circle 406 is a portion of the first state information 402 associated with the taking slight left turn maneuver at the second point 306 and in a dotted circle 408 is a portion of the second state information 404 associated with the taking slight right turn maneuver at the second point 306. The server 104 is configured to assign impact units to each of the portion of the first state information 402 in the dotted circle 406 and the portion of the second state information 404 in the dotted circle 408 (as well all other state information collected from others of the plurality of electronic devices at the second route point 306, as well as other route points).

In some embodiments of the present technology, the impact units can be on a numeric scale, such as zero to ten, zero to hundred and the like. Alternatively, the impact units can be on an alpha-numeric scale, such as A to F, A to Z and the like. Alternatively, the impact units can be quantitative, such as "small", "medium", "large" and the like.

Generally speaking, the impact units represent an impact of the geo-maneuver on the state information of the second sensor 704. With the example of the scale of the impact units varying from zero to ten, the larger the value of the impact unit, the more of the impact the particular maneuver has on the state of the second sensor 704. As an example only, a value of 8 would be assigned to a higher impact than the impact to which a value of 4 is assigned. In the depicted example, the impact units assigned to the portion of the first state information 402 in the dotted circle 406 can be, for example, "−4" and the impact units assigned to the portion of the second state information 404 in the dotted circle 408 can be, for example, "+8", where the value of the impact units represent the magnitude of the impact, while the negative or positive sign represent the direction of the impact.

It is noted that within the illustration of FIG. 4, the state information is taken continuously as the electronic device 102 moves through the route. In alternative embodiments of the present technology, the state information can be taken around the given route point, such as for example starting certain distance or time before the given route point and continuing till certain distance or time after the given route point. In some embodiments of the present technology, the state information received by the server 104 can be anonymous (i.e. without any identifiers of the electronic device or the user of the electronic device).

The server 104 is then configured to calculate a statistical average of all the assigned impact units for a given type of maneuver for a given route point. In some embodiments of the present technology, calculating the statistical average comprises building a normal distribution of all impact units for the given type of maneuver for the given route point and selecting the mean value as the statistical maneuver pattern for the second device state for the second sensor 704. In some other embodiments of the present technology, calculating the statistical average comprises building a normal distribution of all impact units for the given type of maneuver for the given route point and selecting all the values within the standard deviation a of the mean value as the statistical maneuver pattern for the second device state for the second sensor 704.

Figure 2:
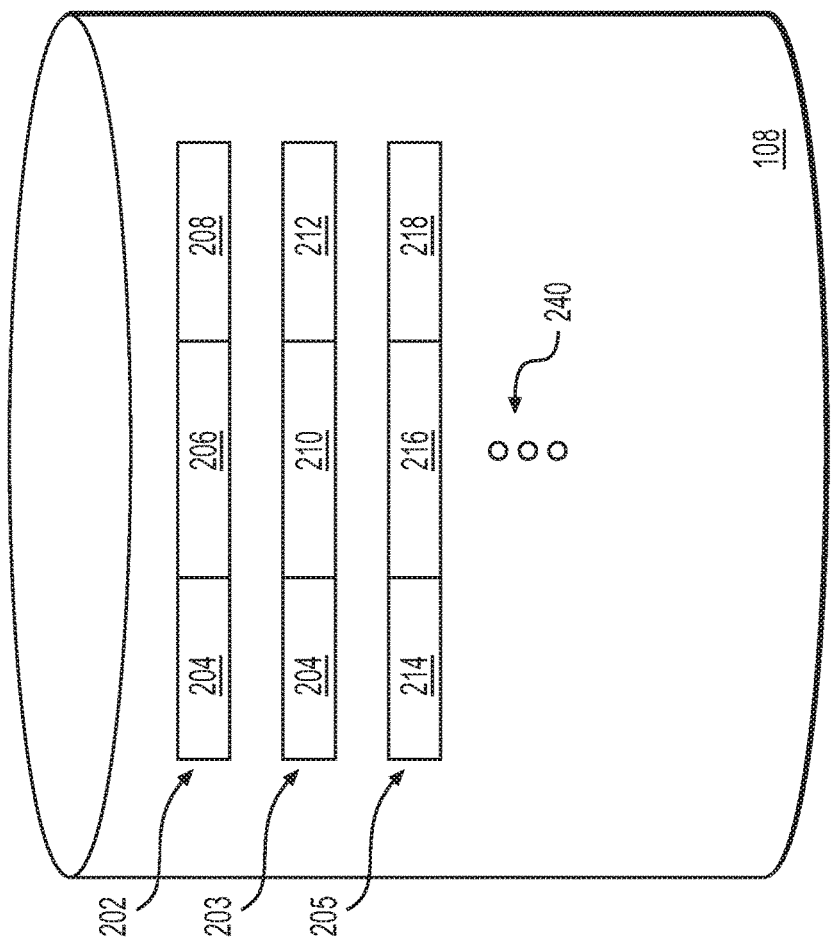
FIG. 2 is a schematic representation of a application database, the application database maintained by a server of the system of FIG. 1, the application database being implemented in accordance with non-limiting embodiments of the present technology.

With reference to FIG. 2, there is depicted a schematic representation of an application database 108, the application database 108 maintained by a server 104, the application database 108 being implemented in accordance with non-limiting embodiments of the present technology.

The server 104 is configured to maintain the application database 108. The server 104 is configured to populate and the application database 108 is configured to maintain a first record 202, a second record 203, a third record 205, as well as a number of additional records jointly depicted 240. Using the first record 202 as an example, the first record 202 can be associated with the second route point 306 and with the geo-maneuver of the slight left turn to eventually reach the point 312. To that extent, the first record 202 maps a point identifier 204 of the second route point 306, a maneuver identifier 206 of the geo-maneuver and a statistical maneuver pattern 208 associated therewith.

By the same token, the second record 203 can be associated with the second route point 306 and with the geo-maneuver of the slight right turn to eventually reach the point 314. To that extent, the second record 203 maps the point identifier 204 of the second route point 306, a maneuver identifier 210 of the geo-maneuver and a statistical maneuver pattern 212 associated therewith.

Similarly, the third record 205 can be associated with the first route point 304 and with the geo-maneuver of the slight right turn to eventually reach the second route point 306. To that extent, the third record 205 maps a point identifier 214 of the first route point 304, a maneuver identifier 216 of the geo-maneuver and a statistical maneuver pattern 218 associated therewith. In some embodiments of the present technology, the point identifier 204, 214 includes one or more of: a geo-location of the associated route point, a physical address of the associated route point, any other suitable unique identifier that uniquely identifies the geo-location of the associated route point.

The number of additional records 240 can maintain similar information to the first record 202, the second record 203 and the third record 205 for one or more additional maneuvers associated with the plurality of route points (such as the first route point 304, the second route point 306, the third route point 308 and the fourth route point 310).

Given the architecture described above, it is possible to execute a method of determining a geolocation of the electronic device 102. As has been described above, the electronic device 102 has the first sensor 702 and the second sensor 704 (as well as the number of additional sensors 706).

Figure 5:
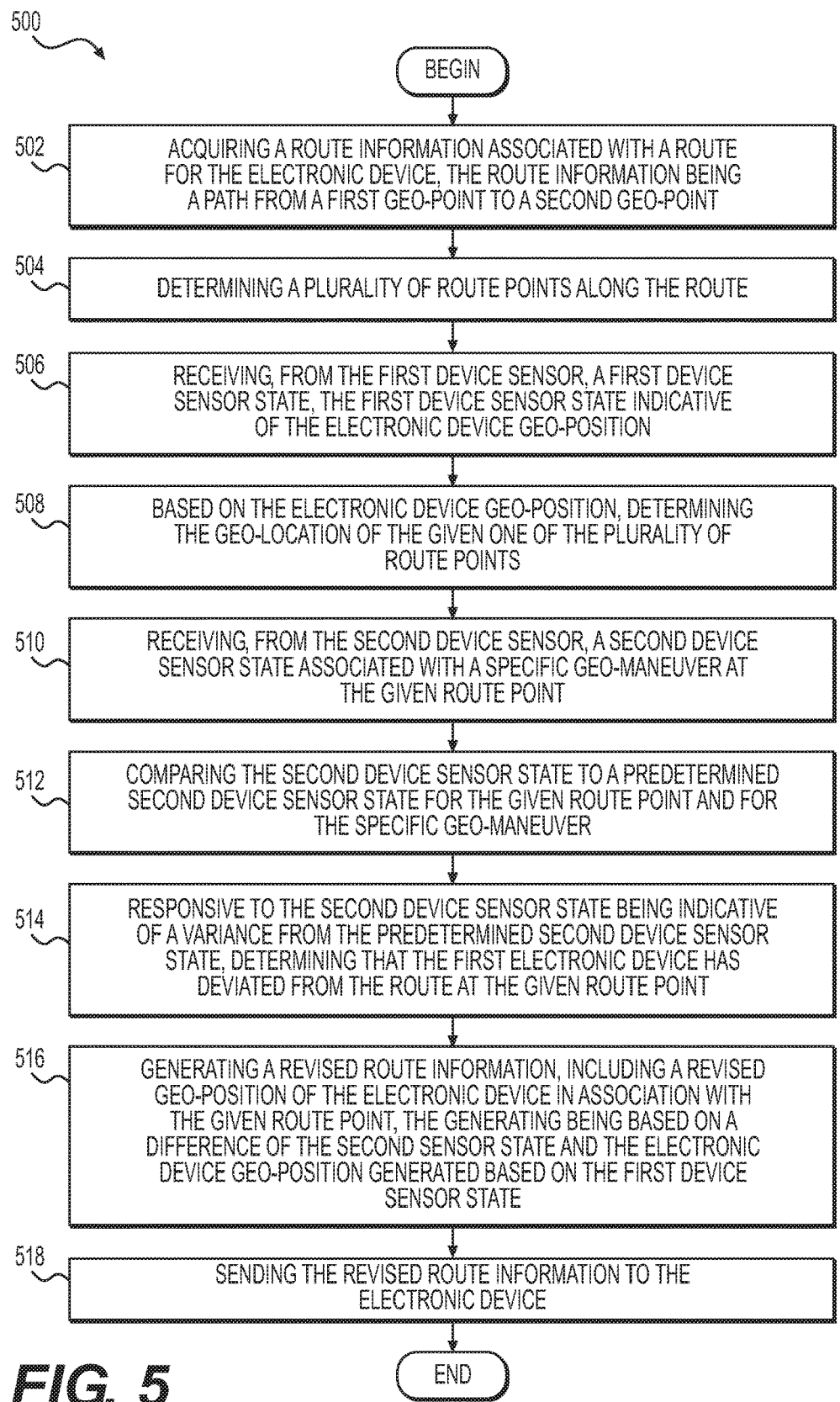
FIG. 5 is a flow chart of a method for determining the geolocation of the electronic device, the method executable by the server of the system of FIG. 1, the method being implemented in accordance with non-limiting embodiments of the present technology.

With reference to FIG. 5, there is depicted a flow chart of a method 500, the method 500 being executable in accordance with non-limiting embodiments of the present technology. The method 500 is executable at the server 104. To that extent, the server 104 has stores or otherwise has access to machine-readable instructions, which instructions when executed cause the server 104 to execute the steps of the method 500.

Step 502—Acquiring a Route Information Associated with a Route for the Electronic Device, the Route Information being a Path from a First Geo-Point to a Second Geo-Point The method 500 starts at step 502, where the server 104 acquires a route information associated with a route for the electronic device 102, the route information being a path from a first geo-point to a second geo-point.

In some embodiments of the present technology, the server 104 generates the route information 302 in response to a route request from the electronic device 102. In alternative embodiments, the electronic device 102 can generate the route information 302 locally and transmit a copy of the route information 302 to the server 104.

Step 504—Determining a Plurality of Route Points Along the Route

Next, at step 504, the server 104 determines a plurality of route points along the route. As has been alluded to above, the server 104 can determine the plurality of route points along the route (i.e. the first route point 304 and the second route point 306) associated with the route information 302 or, in other words, lying along the route from a plurality of all possible route points (i.e. the first route point 304, the second route point 306, the third route point 308 and the fourth route point 310 can be generated by the server 104). As has been described above, the indication of each one of the first route point 304, the second route point 306, the third route point 308 and the fourth route point 310 can be, at a point of time prior to executing the method 500, either (i) manually entered by an operator of the server 104 or (ii) determined based on the pre-determined rule that can include identifying a given route point with a portion of a route (such as a route associated with the route information 302) where there is a potential for a deviation from the route, such as a junction, a fork, a potential for a line change, a potential for an abrupt stop, acceleration and the like.

Next, the server 104, for a given one of the plurality of route points, executes the following steps. It is noted that the server 104 does not need to execute these steps for each and every route point along the route.

Step 506—Receiving, from the First Sensor, a First Sensor State, the First Sensor State Indicative of the Electronic Device Geo-Position Next at step 506, the server 104 receives from the first sensor 702 of the electronic device 102, a first sensor state, the first sensor state indicative of the electronic device geo-position. Recalling that the first sensor 702 can be implemented as a GPS module, the server 104 can receive an indication of the GPS-based geo-position of the electronic device 102. In FIG. 1, this is depicted as a data pack 140 transmitted from the electronic device 102 to the server 104, the data pack 140 including the geo-position information reading associated with the then position of the electronic device 102 (i.e. the first sensor state).

Step 508—Based on the Electronic Device Geo-Position, Determining the Geo-Location of the Given One of the Plurality of Route Points Then, at step 508, the server 104, based on the electronic device geo-position, determines the geo-location of the given one of the plurality of route points where the electronic device 102 is then located. More specifically, the server 104 analyzes the information received as part of the data pack 140. In some embodiments of the present technology, the server 104 accesses the application database 108, in order to determine if any of the point identifiers 204, 214 (as well as any other point identifiers associated with the one or more records 240) have an identifier of the given one of the plurality of route points that match the received geo-position information.

If no match is detected, the method 500 reverts to step 506, where the server 104 receives another indication of the electronic device geo-position. As such, within these embodiments, the step 506 can be repeated at pre-determined period of time, such as every half a second, every 0.02 seconds, every second or any other suitable pre-determined period of time.

If, on the other hand, there is a match determined, the server 104 determines that the electronic device 102 is located at the given route point. For the purposes of illustration, let it be assumed that the electronic device 102 is indeed located at the second route point 306 and, as such, the server 104 has determined that the first record 202 and the second record 203 have the point identifier 204 that match the current geo-position of the electronic device 102 (i.e. the records associated with various geo-maneuvers possible at the second route point 306).

Step 510—Receiving, from the Second Device Sensor, a Second Sensor State Associated with a Specific Geo-Maneuver at the Given Route Point The server 104, then as part of step 510, receives from the second sensor 704 of the electronic device 102, a second sensor state associated with a specific geo-maneuver at the given route point. In some embodiments of the present technology, step 510 is executed at the same time as step 506. In other words, the second sensor state can be received as part of the data pack 140. In alternative embodiments, the second sensor state can be received separately, such as part of a data pack 142.

Step 512—Comparing the Second Sensor State to a Predetermined Second Sensor State for the Given Route Point and for the Specific Geo-Maneuver Next, at step 512, the server 104 compares the second sensor state to a predetermined second sensor state for the given route point and for the specific geo-maneuver. The server 104 accesses the application database 108, locates the records associated with the given route point (in this case, the first record 202 and the second record 203 are identified as associated with the second route point 306).

The server 104 then determines which geo-maneuver the electronic device 102 is supposed to execute—in this case, according to route information 302, the electronic device 102 is supposed to make the slight left turn at the second route point 306. As such, based on the maneuver identifier 206 and the maneuver identifier 210, the server 104 determines that the first record 202 is associated with the geo-maneuver that the electronic device 102 is supposed to execute in accordance with the route information 302.

The server 104 then retrieves the statistical maneuver pattern 208 stored in the application databased 108 and compares the second sensor state to the statistical maneuver pattern 208, which statistical maneuver pattern 208 is indicative of the predetermined second sensor state for the given route point and for the specific geo-maneuver.

In some embodiments of the present technology, the server 104 can use density-based spatial clustering of applications with noise (DBSCAN) algorithm to compare the second sensor state to the statistical maneuver pattern 208. In alternative embodiments of the present technology, a machine trained algorithm (such as a trained neural network) can be used to execute comparison of the second sensor state to the statistical maneuver pattern 208. Any other approach to comparing the second sensor state to the statistical maneuver pattern 208 can be used.

Step 514—Responsive to the Second Sensor State being Indicative of a Variance from the Predetermined Second Sensor State, Determining that the First Electronic Device has Deviated from the Route at the Given Route Point Next, at step 514, responsive to the second sensor state being indicative of a variance from the predetermined second sensor state, the server 104 determines that the electronic device 102 has deviated from the route at the given route point.

In some embodiments, the method 500 can then terminate or return to executing step 502.

In other words, if the second sensor state for the given route point does not match information stored in the statistical maneuver pattern 208, the server 104 determines that the electronic device 102 has executed the geo-maneuver that was not expected to be executed at the given route point in association with the route that the electronic device 102 was supposed to follow.

A technical effect of embodiments of the present technology may be attributable to the fact that the state information associated with the second sensor 704 may be less prone to delay compared to the state information of the first sensor 702. In other words, using the comparison executed in step 512, the server 104 may appreciate the deviation from the route comparatively earlier than if relying purely on the reading of the state information associated with the first sensor 702.

Step 516—Generating a Revised Route Information, Including a Revised Geo-Position of the Electronic Device in Association with the Given Route Point, the Generating being Based on a Difference of the Second Sensor State and the Electronic Device Geo-Position Generated Based on the First Sensor State Next, at step 516, the server 104 generates a revised route information, including a revised geo-position of the electronic device 102 in association with the given route point, the generating being based on a difference of the second sensor state and the electronic device geo-position generated based on the first sensor state Step 518—Sending the Revised Route Information to the Electronic Device 102

Next, at step 518, the server 104 sends the revised route information to the electronic device 102.

In some embodiments of the present technology, the server 104 can execute the method 500 for more than one electronic devices 102 that pass through the given route point (such as one of the first route point 304, the second route point 306, the third route point 308 and the fourth route point 310). In some embodiments of the present technology, the server 104 can analyze the indications of more than one of the electronic devices 102 deviating from the prescribed route. For example, if all the indications of deviations are consistent between various electronic devices 102 and are consistently indicative of the electronic devices 102 deviating from the same prescribed route at the same given route point, the server 104 can deduct that there is a problem associated with the prescribed route at the given route point. Within the description of the embodiments, "consistent" may mean above a pre-determined threshold. For example, pre-determined threshold can be over 80% of readings, over 60% of readings and the like.

For example, if the server 104 deducts a pattern that the plurality of electronic devices 102 that, based on their route information 302, were to take a slight left turn at the second route point 306 instead take the slight right turn at the second point 306, the server 104 may deduct that there is a route obstruction associated with the left turn at the second point 306 (for example, lane closure, an accident and the like). As such, in some embodiments of the present technology, the method 500 further comprises: in response to the plurality of second sensor states being indicative of the deviation from the route information, determining that there is a route problem associated with the route information at the given one of the plurality of route points.

In some embodiments of the present technology, as part of the method 500 and prior to executing step 502, the server 104 generates the predetermined second sensor state (i.e. server 104 generates the statistical maneuver pattern 208, the statistical maneuver pattern 212, the statistical maneuver pattern 218, as well as the statistical maneuver patterns for one or more other records 240).

As has been alluded to above, the step of generating the predetermined second sensor state can include: (a) acquiring, from a plurality of electronic devices 102, a plurality of indications of a previous second sensor states, each of the plurality of indications of a previous second sensor state associated with a previous second device sensor, the previous second sensor being of a same type as the second device sensor, a respective indication of the previous second sensor state being generated during a previous geo-maneuver, the previous geo-maneuver being of a same type as the specific geo-maneuver; (b) analyzing the plurality of indications of a previous second sensor state to render a statistical maneuver pattern; (c) assigning the statistical maneuver pattern as the predetermined second sensor state for the specific geo-maneuver.

In some embodiments of the method 500, the step of analyzing the plurality comprises calculating a statistical average of the previous second sensor state.

In some embodiments of the method 500, the step of calculating statistical average comprises assigning an impact score to each of the plurality of indications of a previous second sensor state.

In some embodiments of the method 500, prior to executing step 502, the method 500 further comprises defining a plurality of route points along the route, the route being one of a plurality of routes. The step of defining the plurality of route points comprises, as has been described above, receiving an indication of the plurality of route points along the route from an operator. Alternatively, the step of defining the plurality of route points can be based on a pre-determined rule. The pre-determined rule can include defining a route points at a portion of the route where there is a possibility for a deviation from the route.

In some embodiments of the present technology, step 512 can be executed differently from what has been described in the paragraphs above. As such, in some embodiments of the present technology, as part of executing step 512, the server 104 compares the second sensor state to the statistical maneuver pattern 208 and the statistical maneuver pattern 212 (i.e. the two statistical maneuver patterns associated with the given route point that is associated with the then geo-position of the electronic device 102). The server 104 can then assign a probability parameter—for each of (i) the second sensor state matching the statistical maneuver pattern 208 and (ii) the second sensor state matching the statistical maneuver pattern 208. By comparing the probability parameters as defined in (i) and (ii), the server 104 can determine which of the two geo-maneuvers the electronic device 102 is more likely to have executed at the given route point.

In some additional embodiments of the present technology, the second sensor state information can be associated with a period of time starting a pre-determined period of time before the expected time when the electronic device 102 is supposed to be at the given route point and ending a pre-determined period of time thereafter (such as minus 2, 4, 6, 8, 10, 15, 20, 30 seconds to plus 2, 4, 6, 8, 10, 15, 20, 30 seconds).

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

One skilled in the art will appreciate when the instant description refers to "receiving data" from a user that the electronic device executing receiving of the data from the user may receive an electronic (or other) signal from the user. One skilled in the art will further appreciate that displaying data to the user via a user-graphical interface (such as the screen of the electronic device and the like) may involve transmitting a signal to the user-graphical interface, the signal containing data, which data can be manipulated and at least a portion of the data can be displayed to the user using the user-graphical interface.

Some of these steps and signal sending-receiving are well known in the art and, as such, have been omitted in certain portions of this description for the sake of simplicity. The signals can be sent-received using optical means (such as a fibre-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of determining a geolocation of an electronic device, the electronic device having a first sensor and a second sensor, the method executable at a server, the server being in communication with the electronic device via a communications network, the method comprising:
  acquiring a route information associated with a route for the electronic device, the route information being a path from a first geo-point to a second geo-point;
  determining a plurality of route points along the route, each route point being a point potentially associated with a deviation from the route information;
  for a given one of the plurality of route points:
    receiving, from the first sensor, a first sensor state, the first sensor state indicative of the electronic device geo-position, wherein the first sensor is one of a GPS module and a global navigation satellite system (GLONASS) module;
    based on the electronic device geo-position, determining the geo-location of the given one of the plurality of route points;
    receiving, from the second device sensor, a second sensor state associated with a specific geo-maneuver at the given route point;

comparing the second sensor state to a predetermined second sensor state for the given route point and for the specific geo-maneuver;

responsive to the second sensor state being indicative of a variance from the predetermined second sensor state, determining that the electronic device has deviated from the route at the given route point;

generating a revised route information, including a revised geo-position of the electronic device in association with the given route point, the generating being based on a difference of the second sensor state and the electronic device geo-position generated based on the first sensor state;

sending the revised route information to the electronic device.

2. The method of claim 1, wherein the second sensor comprises a sensor different from the GPS module and the GLONASS module.

3. The method of claim 2, wherein the second sensor comprises at least one of:
an accelerometer,
an ambient temperature measurement device,
a device for measuring the force of gravity,
a gyroscope,
a device for measuring ambient light,
a device for measuring acceleration force,
a device for measuring ambient geomagnetic field,
a device for measuring a degree of rotation,
a device for measuring ambient air pressure,
a device for measuring relative ambient humidity,
a device for measuring device orientation,
a device for measuring temperature of the device.

4. The method of claim 1, further comprising, prior to the acquiring the route information, generating the predetermined second sensor state.

5. The method of claim 4, wherein the generating the predetermined second sensor state comprises:
acquiring, from a plurality of electronic devices, a plurality of indications of a previous second sensor states, each of the plurality of indications of a previous second sensor state associated with a previous second device sensor, the previous second sensor being of a same type as the second device sensor, a respective indication of the previous second sensor state being generated during a previous geo-maneuver, the previous geo-maneuver being of a same type as the specific geo-maneuver;
analyzing the plurality of indications of a previous second sensor state to render a statistical maneuver pattern;
assigning the statistical maneuver pattern as the predetermined second sensor state for the specific geo-maneuver.

6. The method of claim 5, wherein analyzing the plurality of indications comprises calculating a statistical average of the previous second sensor state.

7. The method of claim 6, wherein the calculating statistical average comprises assigning an impact score to each of the plurality of indications of a previous second sensor state.

8. The method of claim 1, further comprising prior to the acquiring a route information associated with a route for the electronic device, defining plurality of route points along the route, the route being one of a plurality of routes.

9. The method of claim 8, wherein the defining a plurality of route points comprises receiving an indication of the plurality of route points along the route from an operator.

10. The method of claim 8, wherein the defining a plurality of route points is based on a pre-determined rule.

11. The method of claim 1, wherein the electronic device is one of a plurality of electronic devices, the second sensor is one of a plurality of second sensors respectively associated with the plurality of electronic devices and the second sensor state is one of a plurality of second sensor states respectively generated by the plurality of second device sensors, the method further comprising:
in response to the plurality of second sensor states being indicative of the deviation from the route information, determining that there is a route problem associated with the route information at the given one of the plurality of route points.

12. A server comprising:
a communication interface for communication with an electronic device via a communication network,
a memory module;
a processor operationally connected with the communication interface and the memory module, the processor configured to determine a geolocation of an electronic device, the electronic device having a first sensor and a second sensor, the processor being further configured to:
acquiring a route information associated with a route for the electronic device, the route information being a path from a first geo-point to a second geo-point;
determine a plurality of route points along the route, each route point being a point potentially associated with a deviation from the route information;
for a given one of the plurality of route points:
receive, from the first sensor, a first sensor state, the first sensor state indicative of the electronic device geo-position wherein the first sensor is one of a GPS module and a global navigation satellite system (GLONASS) module;
based on the electronic device geo-position, determine the geo-location of the given one of the plurality of route points;
receive, from the second device sensor, a second sensor state associated with a specific geo-maneuver at the given route point;
compare the second sensor state to a predetermined second sensor state for the given route point and for the specific geo-maneuver;
responsive to the second sensor state being indicative of a variance from the predetermined second sensor state, determine that the electronic device has deviated from the route at the given route point;
generate a revised route information, including a revised geo-position of the electronic device in association with the given route point, the generating being based on a difference of the second sensor state and the electronic device geo-position generated based on the first sensor state;
send the revised route information to the electronic device.

13. The server of claim 12, wherein the second sensor comprises a sensor different from the GPS module and GLONASS module.

14. The server of claim 13, wherein the second sensor comprises at least one of:
an accelerometer,
an ambient temperature measurement device,
a device for measuring the force of gravity,
a gyroscope,
a device for measuring ambient light,
a device for measuring acceleration force,
a device for measuring ambient geomagnetic field, a device for measuring a degree of rotation,
a device for measuring ambient air pressure,
a device for measuring relative ambient humidity,
a device for measuring device orientation,
a device for measuring temperature of the device.

15. The server of claim 12, the processor being further configured, prior to the acquiring the route information, to generate the predetermined second sensor state.

16. The server of claim 15, wherein to generate the predetermined second sensor state, the processor is configured to:
 acquire, from a plurality of electronic devices, a plurality of indications of a previous second sensor states, each of the plurality of indications of a previous second sensor state associated with a previous second device sensor, the previous second sensor being of a same type as the second device sensor, a respective indication of the previous second sensor state being generated during a previous geo-maneuver, the previous geo-maneuver being of a same type as the specific geo-maneuver;
 analyze the plurality of indications of a previous second sensor state to render a statistical maneuver pattern;
 assign the statistical maneuver pattern as the predetermined second sensor state for the specific geo-maneuver.

17. The server of claim 16, wherein to analyze the plurality of indications, the processor is configured to calculate a statistical average of the previous second sensor state.

18. The server of claim 17, wherein to calculate statistical average, the processor is configured to assign an impact score to each of the plurality of indications of a previous second sensor state.

* * * * *